United States Patent
Schirris et al.

(10) Patent No.: US 8,873,880 B2
(45) Date of Patent: Oct. 28, 2014

(54) DETECTION AND/OR ENHANCEMENT OF CONTRAST DIFFERENCES IN DIGITAL IMAGE DATA

(75) Inventors: Johan Schirris, Veldhoven (NL); Sasa Cvetkovic, Eindhoven (NL)

(73) Assignee: Robert Bosch GmbH, Stuttgart (DE)

(*) Notice: Subject to any disclaimer, the term of this patent is extended or adjusted under 35 U.S.C. 154(b) by 162 days.

(21) Appl. No.: 13/643,690

(22) PCT Filed: Apr. 26, 2010

(86) PCT No.: PCT/EP2010/055537
§ 371 (c)(1),
(2), (4) Date: Jan. 2, 2013

(87) PCT Pub. No.: WO2011/134490
PCT Pub. Date: Nov. 3, 2011

(65) Prior Publication Data
US 2013/0114912 A1 May 9, 2013

(51) Int. Cl.
*G06K 9/40* (2006.01)
*G06T 5/00* (2006.01)

(52) U.S. Cl.
CPC ......... *G06T 5/00* (2013.01); *G06T 2207/20012* (2013.01); *G06T 5/008* (2013.01); *G06T 2207/20016* (2013.01)
USPC ........ 382/274; 382/272; 382/263; 348/222.1; 348/678

(58) Field of Classification Search
CPC . G06T 5/00; G06T 5/008; G06T 2207/20012; G06T 2207/20016
USPC ......... 382/274, 260, 114, 169, 261, 263, 276; 348/222.1, 678
See application file for complete search history.

(56) References Cited

U.S. PATENT DOCUMENTS

| 4,761,819 A | 8/1988 | Denison et al. |
| 4,941,190 A | 7/1990 | Joyce |

(Continued)

FOREIGN PATENT DOCUMENTS

EP 0278137 8/1988

OTHER PUBLICATIONS

PCT/EP2010/055537 International Search Report dated Jan. 24, 2011 (3 pages).

(Continued)

*Primary Examiner* — Mekonen Bekele
(74) *Attorney, Agent, or Firm* — Michael Best & Friedrich LLP (57) ABSTRACT

A method for obtaining and/or enhancing local contrast differences (LD) in digital image input data (in), wherein a local contrast measure ($SAD^{ap}$) approximating a two-dimensional sum of absolute difference (SAD) measure is obtained by obtaining a first-dimension sum of absolute difference measure ($energyV_k(m, n)$) representing a sum of absolute difference (SAD) in a first dimension of at least one image region, and obtaining the local contrast measure ($SAD^{ap}$) as a second-dimension convoluted first-dimension sum of absolute difference measure by convoluting the first-dimension sum of absolute difference measure ($energyV_k(m, n)$) in a second dimension of the at least one image region, is proposed, wherein the step of obtaining the local contrast measure ($SAD^{ap}$) as the second-dimension convoluted first-dimension sum of absolute differences measure further includes an addition step wherein an energy term ($\Delta lpf_k(j)$) representing a first-order difference on a distance (J) of a low pass filtered signal used in obtaining the first-dimension sum of absolute differences measure ($energyV_k(m, n)$) and in obtaining the second-dimension convoluted first-dimension sum of absolute differences measure is introduced while obtaining the local contrast measure ($SAD^{ap}$).

13 Claims, 6 Drawing Sheets

(56) References Cited

U.S. PATENT DOCUMENTS

| | | | |
|---|---|---|---|
| 5,524,070 | A | 6/1996 | Shin et al. |
| 8,351,735 | B2 * | 1/2013 | Biezen et al. ............... 382/274 |
| 2002/0039152 | A1 * | 4/2002 | Choi ............................ 348/678 |
| 2003/0117654 | A1 * | 6/2003 | Wredenhagen et al. ..... 358/3.21 |
| 2003/0218679 | A1 | 11/2003 | Castorina et al. |
| 2004/0136570 | A1 * | 7/2004 | Ullman et al. ............... 382/114 |
| 2009/0129695 | A1 * | 5/2009 | Aldrich et al. ............... 382/261 |
| 2009/0238486 | A1 | 9/2009 | Biezen et al. |
| 2014/0146198 | A1 * | 5/2014 | Omori et al. ............... 348/222.1 |

OTHER PUBLICATIONS

Cvetkovic et al., "Non-Linear Locally-Adaptive Video Contrast Enhancement Algorithm Without Artifacts", IEEE Transactions on Consumer Electronics, IEEE, Service Center, New York, NY, US, vol. 54, No. 1, Feb. 1, 2008, pp. 1-9, XP011225494.

Cvetkovic et al., "Multi-band locally-adaptive contrast enhancement algorithm with built-in noise and artifact suppression mechanism," Visual Communications and Image Processing, Jan. 29, 2008, pp. 1-9, XP030081228.

Narenda et al., "Real-time adaptive contrast enhancement", IEEE Trans. Pattern Anal. Mach. Intell, 3 (6) 655-661, 1981.

Schutte, "Multi-Scale Adaptive Gain Control of IR Images", Infrared Technology and Applications XXIII, Proc. of SPIE 3061, 906-914, 1997.

* cited by examiner

DETECTION AND/OR ENHANCEMENT OF CONTRAST DIFFERENCES IN DIGITAL IMAGE DATA

The current invention relates to a method for detecting and/or enhancing local contrast differences in digital image data, to a corresponding image processing system and to a corresponding computer program product.

PRIOR ART

For real-time imaging with digital video cameras and for high-quality display in modern TV sets, proper visibility of details is a prerequisite to ensure user quality acceptance. In this context, especially complex scenes and lower-quality video footage require sharpness and contrast improvements to increase visibility and perception of image details. To this purpose, video signals are often subjected to an enhancement processing, compensating, at least partially, for varying lighting conditions and for variabilities of scenes with non-ideal luminance distribution, and thus improving perception, sharpness, and contrast, For enhancement processing of video signals, global and local methods are known. Global methods, wherein a common transformation function is applied to all pixels of the input image, are not appropriate in complex image situations, where contrast may be poor in some areas of the image but adequate in other areas, or wherein overall contrast is acceptable but local contrast low. Furthermore, low-quality video footage originating from low-quality capturing devices poses significant challenges if an acceptable output video quality is to be achieved. In all these cases, locally-adaptive contrast enhancement is expected to provide significant advantages for the perceived output image quality and the visibility of details. Therefore, in a number of cases, locally adaptive contrast enhancement methods are preferred over global methods.

Especially in such local methods, image enhancement techniques depend on measuring the local signal energy for their processing. However, the computational complexity of the calculations involved is very high, especially when using filters with large kernels. On the other hand, large filter kernels are needed to achieve the desired level of quality improvement due to the intrinsically high image resolutions. Especially in real-time video applications, the computation complexity should be low to save costs and to avoid processing delays, which poses a significant design challenge and has a clear impact on possible solutions for image quality optimization.

As single-scale adaptive gain control for contrast enhancement, wherein the image is processed with a filter with a single size, length or area, often does not fulfill the requirements of detail enhancement in different areas of the images in a sufficient manner, multi-scale approaches including local processing with filters of different scales were proposed previously. The retrieved data are combined in a weighted manner, whereby the retrieved data of each scale is typically amplified dependent on the reciprocal value of the standard deviation of the respective unfiltered data.

For example, P. M. Narendra and R. C. Fitch, in "Real-time adaptive contrast enhancement", *IEEE Trans. Pattern Anal. Mach. Intell.* 3 (6) 655-661, 1981, and WO 2008 046 450 A1, and K. Schutte, in "Multi-Scale Adaptive Gain Control of IR Images", Infrared Technology and Applications XXIII, *Proc. of SPIE* 3061, 906-914, 1997, disclose multi-scale approaches for generating an enhanced output image o from an input image in given by:

$$o = in + \sum_{k=1}^{K} \frac{C_k}{LD_k} \cdot (in - lpf_k)$$

and $$o = in + \sum_{k=1}^{K} \frac{C_k}{LD_k} \cdot (lpf_k - lpf_{k+1}),$$

where K is the number of scales used; $lpf_k$ is the local mean of the kernel, $C_k$ are gain factors controlling the enhancement level per kernel and $LD_k$ represents the local deviation per kernel.

According to the latter publication, the approach results in an image with a large range of temperatures and a large range of scales simultaneously, without producing artifacts as observed in other methods.

WO 2008 046 450 A1 discloses an image processing system for contrast enhancement of an input image comprising an input module for receiving the input image to be processed, a filtering module operable to locally process the input image by filters of different scales, whereby for each of the different scales a locally processed image data and at least one statistic value in form of a local standard deviation (LSD) corresponding to the locally filtered image data is generated, a combining module operable to locally combine the processed image data of the different scales using a gain function, thereby generating a contrast enhanced image, wherein the gain function is dependent on the statistic value corresponding to the locally processed image data of the respective scale, and an output module for outputting the contrast enhanced image. In this context, WO 2008 046 450 A1 proposes to provide a gain function comprising at least one further local dependent correction term in order to suppress artifacts in the contrast enhanced image.

Figure 1A:
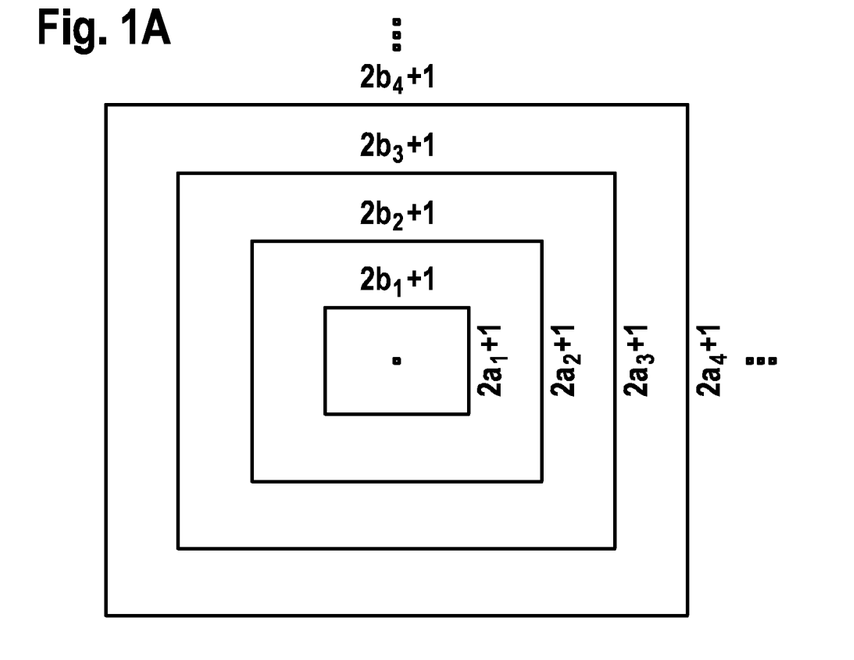
FIGS. 1A, 1B, 1C schematically illustrate aspects of a single-scale adaptive gain control method for contrast enhancement.
Figure 1B:
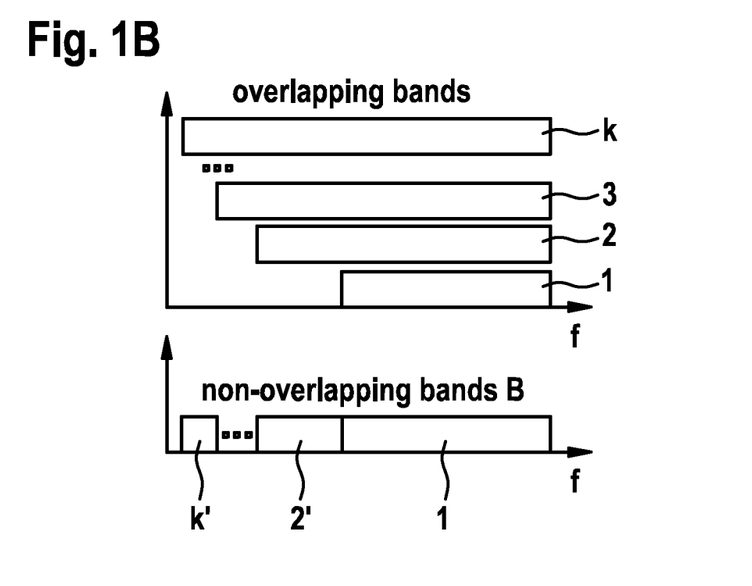
Figure 1C:
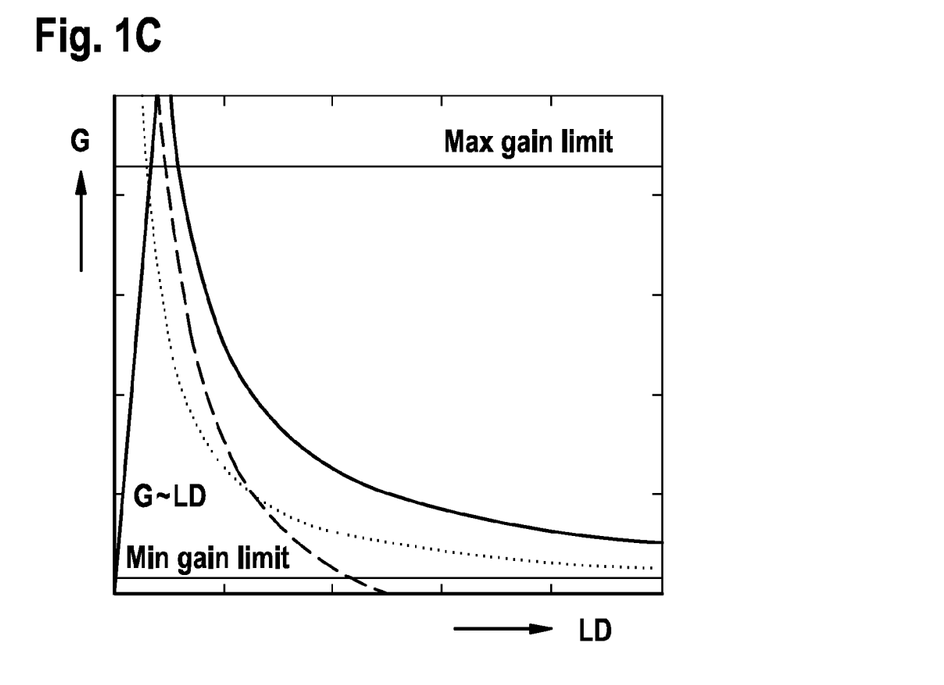

Such a method is illustrated in FIG. 1, wherein in FIG. 1A a multi-scale sliding window in the spatial domain and in FIG. 1B multi-scale overlapping bands 1, 2, ..., k and non-overlapping bands $B_k = lpf_k - lpf_{k+1}$ marked as 1, 2', ..., k' and representing a multiscale-enhancement, wherein $band_i = band_i - band_{i-1}$, are shown. $G_k$ represents the contrast gain of the k-th kernel, as shown in FIG. 1C and, e.g., further discussed in WO 2008 046 450 A1.

By using the above methods, an improvement of the image is obtained by amplifying medium and higher frequencies in the image by a gain that is inversely proportional to the local standard deviation. Thus, areas with a low level of detail (and thus a lower LSD) are amplified to a higher extent to make them visible.

The major problem associated to an image enhancement algorithms including LSD determination is that such calculations are highly demanding in terms of software (SW) and hardware (HW) requirements and that a proper choice of a local energy measurement in such methods, which is often not available, is crucial to achieve optimum enhancement results.

Therefore, a need for simple and efficient ways for detecting and/or enhancing local contrast differences in digital image data remains to exist.

DISCLOSURE OF THE INVENTION

According to the invention, a method for detecting and/or enhancing local contrast differences in digital image data, a corresponding image processing system and a corresponding computer program product with the features of the independent claims is provided. Advantageous and/or preferred embodiments are disclosed in the depending claims, in the description and/or in the figures.

ADVANTAGES OF THE INVENTION

The current invention provides an advantageous method to calculate local energy (local deviation, LD) measurements 2D-separably and provides, in particular, a method to approximate a sum of absolute differences (SAD) metric.

Furthermore, a method for obtaining an improved contrast gain function is proposed that solves for halo artifacts and enables perceptually uniform contrast enhancement. In a yet a further aspect of the current invention, a method for preventing signal clipping is provided.

In the current application, "2D-separable" shall denote a method or algorithm which can be performed separately and successively in two dimensions, in contrast to a "2D-inseparably" or "non separably" method or algorithm which is limited to a simultaneous operation in both dimensions. The skilled person will understand that a 2D-separably method or algorithm is less resource demanding and thus favorable in the context of the current invention.

The current invention provides significant advantages for camera manufacturers, in various local contrast image enhancement applications, and for a fast calculation of the sum of absolute differences. According to the invention, an image processing system or apparatus is preferably realized as digital image processing system using a platform in form of a computer system, like a personal computer, a DSP, an embedded system or the like, and provides or is operable to provide contrast enhancement of an input image. The input image is especially embodied as a camera image of a camera system operating, preferably in the visible area, but also images of the UV, NIR, IR, FIR wavelength area may be used in connection with the invention. Alternatively, the input image is provided as a recorded and/or compressed image.

In the following description, in various Embodiments preferred choices of the energy (or LD) measurement will be described together with the demands or "costs" in terms of SW and HW and their degree of complexity. As mentioned, the inventive way of computing LD which is 2D-separable and thus favorable for any HW/SW implementation.

Furthermore, the new energy measurement method approximating SAD, referred to as $SAD^{ap}$, will be described which is 2D-separable and which approximates SAD, but simultaneously exhibits advantageous features as compared to SAD. Especially, ringing-artifacts may be much better suppressed with the proposed $SAD^{ap}$ energy measurement. $SAD^{ap}$ can be used to substitute the calculation of the SAD regardless of the context, namely not only for the local energy calculation used in the process of the local contrast enhancement, but also in all applications where an SAD metric is used. In this context, it will be shown that it is possible to down-sample the $SAD^{ap}$ method and thus even further reduce the costs of HW/SW providing an additional advantage to this method. Furthermore, it will be shown that modifications to LD calculation are possible, yielding in a further improvement in system performance.

These and further advantages and embodiments of the invention will be evident from the description and the accompanying drawings. It should be noted that the features mentioned above and to be explained below are not limited to the indicated combinations but are likewise usable in other combinations or alone without departing from the scope of the current invention.

The invention is illustrated by embodiments in the drawings and will be described with reference to the drawings.

One important aspect of a detail enhancement scheme, as mentioned, is the choice of a suitable local signal energy measurement (LD) method. In the following description, possibilities and the consequences of choosing each of these are discussed to illustrate the background and the concept of the invention.

Local standard deviation (LSD) is, albeit yielding excellent results without almost any disturbing ringing artifacts, an energy measurement method considered disandvantageous in the applications of interest due to its "costs" in terms of hardware and/or calculation. Taking $N_v=2a_k+1$ and $N_h=2b_k+1$ as window sizes in a k-th kernel (vertical and horizontal sizes, respectively), a biased LSD is computed as:

$$LSD_k(m,n) = \sqrt{\frac{\sum_{i=-a_k}^{a_k} \sum_{j=-b_k}^{b_k} (lpf_k(m,n) - in(m+i, n+j))^2}{(2a_k+1) \cdot (2b_k+1)}}.$$

In the above equation, the local mean of the kernel, $lpf_k$ is pre-calculated by means of a 2D-separable convolution (filtering).

To calculate the LSD by the above equation at each pixel position, one has to perform $N_v N_h = (2a_k+1)(2b_k+1)$ operations of memory fetching, multiplications (square operations) and additions, which is considered too demanding to HW/SW. If realized in SW, this method, requiring a run time of ca. 20 ms, cannot be preformed in real time.

A much "cheaper" solution may be provided by modifying the above equation and by introducing an intermediate calculation step. This includes separating the horizontal and vertical component of the 2D calculation (i.e., including a 2D-separation) to reduce HW/SW costs.

Such a solution will become evident when all pixel elements in an image window are given as $X=in(m+i, n+j)$ while average image luminance in the window is given as $\overline{X}=\mathrm{lpf}_k(m, n)$. $LSD^2$ may then be given as $$LSD^2 = (1/N_h N_v) \cdot \Sigma(X-\overline{X})^2.$$

Knowing that number of elements in the summation equals to $N_v N_h$, this equation may be rewritten as $$LSD^2 = \frac{1}{N_h N_v} \sum (X - \overline{X})^2$$

$$= \frac{1}{N_h N_v} \sum (X^2 - 2X\overline{X} + \overline{X}^2)$$

$$= \frac{1}{N_h N_v} \sum X^2 - \frac{2}{N_h N_v} \overline{X} \sum X + \frac{1}{N_h N_v} \sum \overline{X}^2$$

$$= \frac{1}{N_h N_v} \sum X^2 - \frac{2}{N_h N_v} \overline{X}(N_h N_v \overline{X}) + \frac{1}{N_h N_v}(N_h N_v \overline{X}^2)$$

$$= \left(\frac{1}{N_h N_v} \sum X^2\right) - \overline{X}^2$$

This expression can be calculated 2D-separably. First, the vertical sum of $X^2$ at a certain position (for the k-th kernel, $n_{th}$ or $(n+j)_{th}$ column, respectively), one has $$V_k(m, n)^2 = \frac{1}{N_v} \sum_{\substack{vertical \\ n_{th}\ column}} X^2$$

$$= \frac{1}{(2a_k + 1)} \sum_{i=-a_k}^{a_k} in^2(m + i, n),$$

or, for any column in the window:

$$V_k(m, n + j)^2 = \frac{1}{N_v} \sum_{\substack{vertical \\ (n+j)_{th}\ column}} X^2$$

$$= \frac{1}{(2a_k + 1)} \sum_{\substack{i=-a_k \\ j=const}}^{a_k} in^2(m + i, n + j)$$

This expression may then be summed horizontally to calculate the total $LSD^2$:

$$LSD_k^2(m, n) = \left[\frac{1}{(2b_k + 1)} \sum_{j=-b_k}^{b_k} V_k^2(m, n + j)\right] - lpf_k^2$$

$$= \left[\frac{1}{(2b_k + 1)} \sum_{j=-b_k}^{b_k} \left(\frac{1}{(2a_k + 1)} \sum_{i=-a_k}^{a_k} in^2(m + i, n)\right)\right] - lpf_k^2.$$

Figure 2:
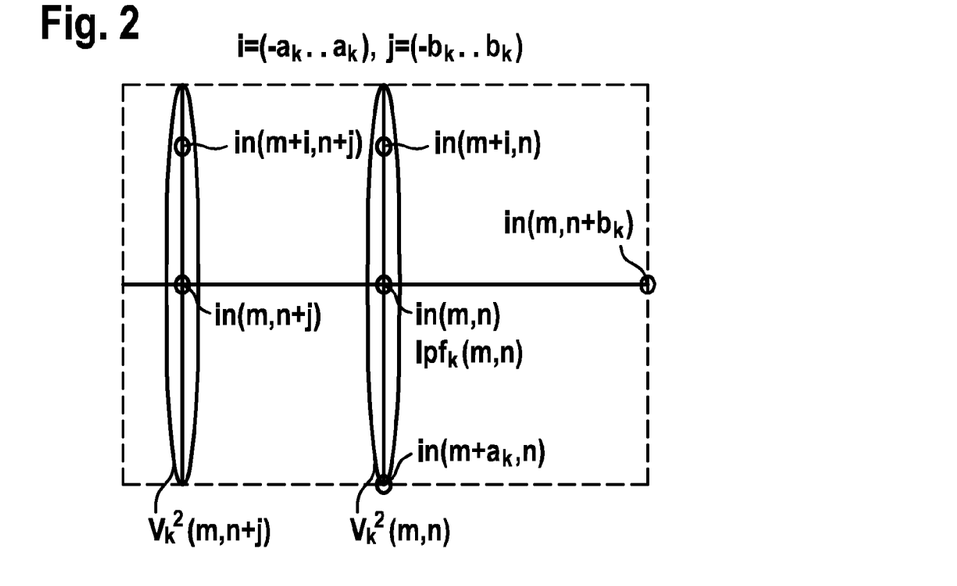
FIG. 2 schematically illustrates a help signal calculation within a support kernel according to a preferred embodiment of the invention.

In other words, first a "help signal" $V_k^2$ from all pixels in the vertical column to which that $lpf_k$ value belongs to is calculated and then a horizontal summation of those values (all scaled with the number of elements) is performed. The help signal ($V_k^2$) calculation within the support kernel is illustrated in FIG. 2. Finally, the square of the signal average value is simply subtracted. LSD is the square root of the previous expression. These operations are easy to implement in HW/SW since processing in the horizontal (pixel) direction may be performed in a processing pipeline and, after finishing with one line proceeds to the next line.

If an unbiased version of LSD is used, given as $$LSDu^2 = \frac{1}{N_h N_v - 1} \sum (X - \overline{X})^2$$

$$= \left(\frac{1}{N_h N_v - 1} \sum X^2\right) - \frac{N_h N_v}{N_h N_v - 1} \overline{X}^2,$$

which can be calculated 2D-separably in the same way as the biased LSD, only modifying the constant scaling values $N_v N_h$ is required during the summation.

One should understand that the expression $\overline{X}=\mathrm{lpf}_k(m, n)$ is usually calculated as a low-pass filtered version of the input signal $X=\mathrm{in}(m, n)$ using box-filters having all equal values in their support ($w=1/N_v N_h=1/(2a_k+1)(2b_k+1)$):

$$\overline{X}_k(m, n) = \sum_k wX$$

$$= \frac{1}{N_h N_v} \sum_k X$$

$$= \frac{1}{(2a_k + 1)(2b_k + 1)} \sum_{j=-b_k}^{b_k} \sum_{i=-a_k}^{a_k} \cdot in(m + i, n + j).$$

However, for the sake of the contrast enhancement performance, often better lpf filters are preferred (like a Gaussian filters) because they exhibit improved frequency characteristics. Most importantly, these lpf filters have much less energy in the side-lobes (stop-band) of the filters, thus creating images with much less perceptual ringing artifacts (as, e.g. discussed in filed patent application number WO 2008 046 450 A1). As such, exact formulas for the LSD are adequately reworked. Starting from the definition $LSD^2=E(X^2)-(E(X))^2$, where $E(X)$ represents an expected value of the variable $X$ filter weights $w$ that are not equal are used, wherein $w \neq 1/N_v N_h$. Likewise, usually higher weights are imparted to central pixels in the window by calculating $$E(X) = \sum wX$$

$$= \sum (w_h \otimes w_v) \cdot X$$

$$= \sum w_h \otimes (w_v \otimes X)$$

$$= \sum_{j=-b_k}^{b_k} w_j \sum_{i=-a_k}^{a_k} \cdot w_i \cdot in(m + i, n + j).$$

Here, a 2D vector of filter weights $w$ is created as a 2D-separable convolution of 1D horizontal and vertical vectors ($w=w_h \hat{X} w_v$, $w_h=w_j$, $w_v=w_i$, where $\hat{X}$ represents a convolution operator). In other words, if a low-pass filter lpf is 2D-separable, then it is also possible to calculate a 2D-separable version of the low-pass filtered signal lpf. Similar arguments also hold for $E(X^2)$ calculation:

$$E(X^2) = \sum wX^2$$

$$= \sum (w_h \otimes w_v) \cdot X^2$$

$$= \sum w_h \otimes (w_v \otimes X^2)$$

$$= \sum_{j=-b_k}^{b_k} w_j \sum_{i=-a_k}^{a_k} \cdot w_i \cdot in^2(m + i, n + j).$$

Therefore, also in those cases the LSD value may be calculated 2D-separably.

Sum of absolute differences (SAD) is, compared to LSD, a cheaper solution which is defined as:

$$SAD_k(m,n) = \frac{\sum_{i=-a_k}^{a_k} \sum_{j=-b_k}^{b_k} |lpf_k(m,n) - in(m+i, n+j)|}{(2a_k+1) \cdot (2b_k+1)}.$$

SAD is, however, not 2D separable. The enhancement performance of SAD is somewhat better than the performance of LSD in uniform texture areas, although LSD distinguishes, due to its quadratic function, small and large details somewhat better than SAD. As a result, LSD also gives less disturbing ringing artifacts. This can be proven starting from the inequality of the geometrical and arithmetical mean which is valid for all real positive numbers $a_l$, l=1, ..., p:

$$(a_1+a_2+\ldots+a_p)/p \leq \sqrt{(a_1^2+a_2^2+\ldots+a_p^2)/p}.$$

If $a_l$ is substituted by $|lpf_k(m,n)-in(m+i, n+j)|$ (for l covering all combinations of indices i and j), this would result in $SAD_k(m,n) \leq LSD_k(m,n)$ for all m, n and k. The previous inequality becomes an equality $SAD_k(m,n)=LSD_k(m,n)$ if and only if all $a_1$ are mutually equal: $a_1=a_2=\ldots=a_p$. This corresponds to an equality of all the terms $|lpf_k(m,n)-in(m+i, n+j)|$, for $i=-a_k, \ldots, a_k, j=-b_k, \ldots, b_k$. In other words, if the entropy of the high-pass signal is the highest (i.e. a local texture is uniform or does not exist), the SAD is equal to the LSD. For edges, these conditions are not satisfied as they are actually distinguishable by significant signal changes, giving rise to a non-uniform texture. The LSD would therefore result in a higher output than the SAD, providing for the smaller local signal gain and less ringing artifacts. However, the SAD will provide for a higher enhancement level in the other areas.

Convolution energy (CE) is yet another measure of the local signal energy. The calculation of the "local standard deviation" is replaced by the calculation of the "local absolute difference" to avoid the need for $x^2$ and $\sqrt{x}$ operations. If $H_k = in - lpf_k$ is assumed to represent an input high-pass signal in the k-th kernel, F a square box filter (having all equal weights) and $\hat{X}$ a 2D convolution, this leads to $lpf_k = in \hat{X} F_k$. If CE is calculated as the sum of the absolute differences between the input image and the low-pass image, $CE_k = |in - lpf_k| \hat{X} F_k$, then some interesting properties hold (proofs are omitted in view of conciseness):

Ho (the enhanced high-frequency output) is invariant to changes in the gain and offset of the input image, so:

$$Ho(a \cdot in + b) = Ho(in)$$

Ho is proportional (scaling s) to the parameter C, that is:

$$Ho(s \cdot C) = s \cdot Ho(C).$$

Figure 3A:
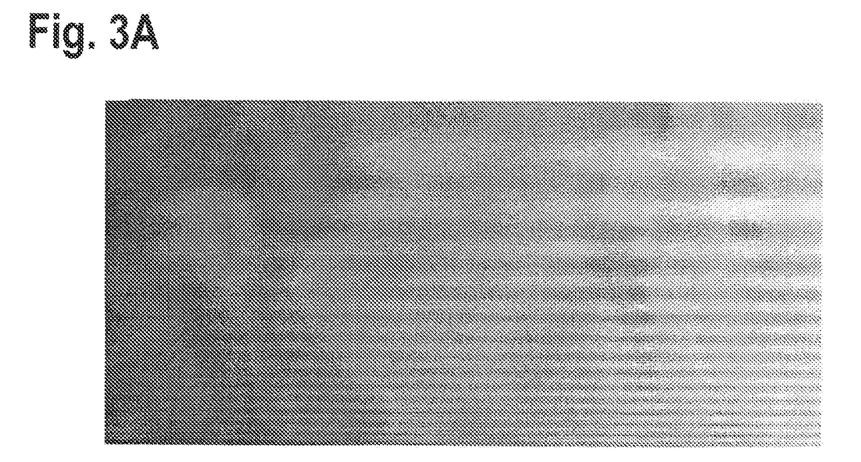
FIGS. 3A, 3B show example input image and output image generated by a method according to a preferred embodiment of the invention.
Figure 3B:
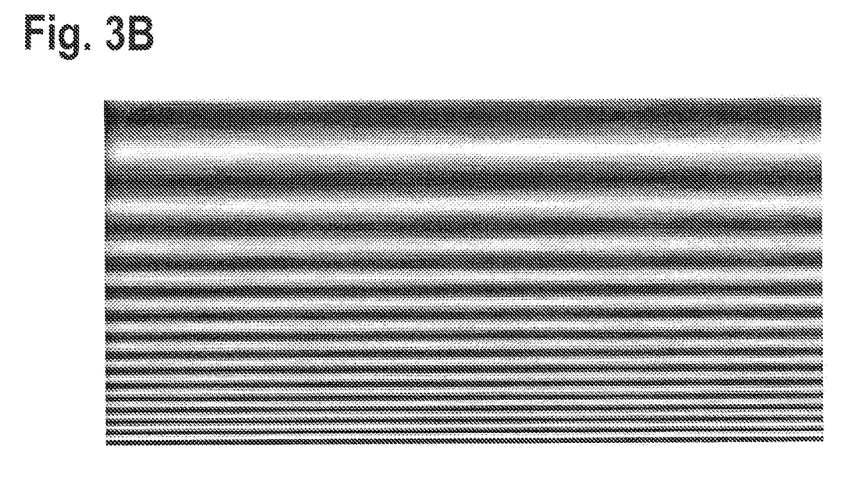

The first property insures that variations in lighting of the input image are in fact compensated. The second property indicates that "C" (contrast gain) is the parameter that can be used to determine the required amount of contrast in the amplified high-pass image, regardless of the amount of contrast in the input image. An example is presented in FIG. 3. The input image shows a vertical frequency sweep that increases in amplitude from left to right. The average intensity (offset b) also increases from left to right (vertical frequency sweep, horizontal linear offset increase). As one can observe, the output image is "corrected" from these variations, or, in other words, the output image is contrast insensitive to frequency, gain and offset.

It should be noted that the above properties hold only for the amplified high-pass image Ho and not for the output image o, because the latter also includes the low-pass image. Modifications that will be discussed in the following sections will decrease the validity of the above properties, but they will further enhance the results, particularly at edges. In general, the original CE measurement creates the largest problems, as it is the smallest on edges and the resulting images show non-acceptable ringing artifacts. The convolution is also rather expensive in HW, which motivates the desire for modifications of the CE.

Figure 4:
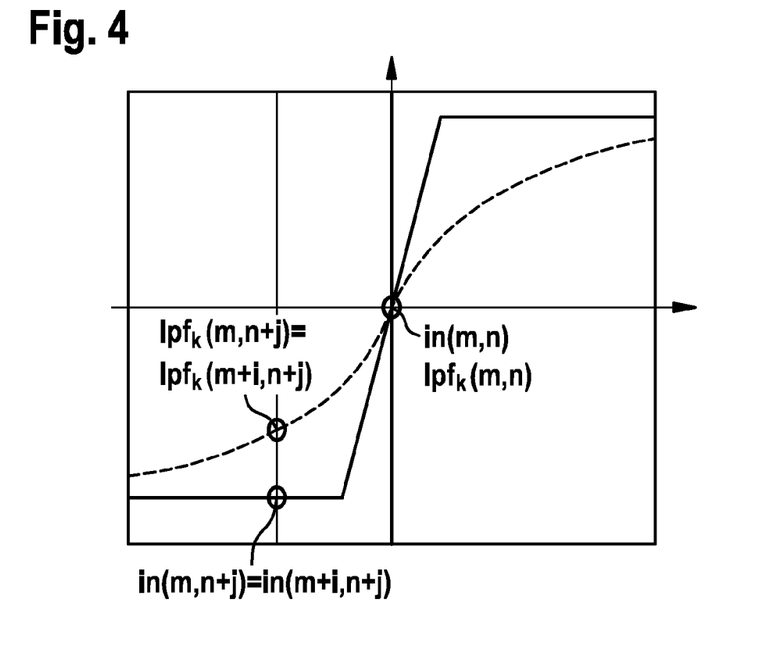
FIG. 4 schematically illustrates an example of a horizontal edge in an image processable according to a preferred embodiment of the invention.

Furthermore, it should be noted that in centralized energy calculations, such as SAD or LSD, the current pixel is subtracted from the average pixel in that kernel. In the CE approach, the current pixel is subtracted from the average pixel value calculated from the kernel, where the current pixel is the central pixel. Likewise, the kernel size is effectively increased two times horizontally and vertically, yielding an effective kernel size increase of four times. This means that the signal energy is accumulated over a much larger area, which is partly beneficial for image enhancement. However, this approach does not measure energy on horizontal and vertical signal slopes (e.g., in a saw-tooth signal). The reason for this is that low-pass signals on a symmetrical slope are at each point equal to the image signal itself. This fact will drastically increase the signal gain at those places (as the measured energy will be zero). Similar reasoning holds for isolated edges, where the difference between the low-pass signal taken at the position of the current pixel and an image signal is much smaller than the difference between the low-pass signal in the kernel's center and the actual image signal. An example is depicted in FIG. 4. This property is more formally expressed as:

$$|lpf_k(m,n)-in(m+i,n+j)|>|lpf_k(m+i,n+j)-in(m+i,n+j)|=|lpf_k(m,n+j)-in(m+i,n+j)|.$$

The last equality is valid as a horizontal edge in the above discussion was assumed. Convolution energy is in general 2D non-separable, and as such expensive for most systems in the context of the current invention. Some efficiency improvements are possible, but among other, external field/frame memories and many line memories are needed. To cope with this problem, a vertical SAD and a horizontal convolution approach is poroposed.

Vertical SAD and horizontal convolution (VSHC) is a modification of the CE approach giving measurements and perceptual results which are in between the results of SAD and the CE approach. Horizontal and vertical components of the 2D calculations may be separated to reduce HW costs. For this purpose, first the vertical sum of absolute differences between a low-pass filtered lpf value at a certain position and all pixels in the vertical column to which that lpf value belongs is calculated (k is a kernel number, $2a_k+1$ and $2b_k+1$ are kernel sizes at the k-th scale):

$$energyV_k(m,n) = \frac{\sum_{i=-a_k}^{a_k} |lpf_k(m,n) - in(m+i, n)|}{(2a_k+1)}.$$

In a second pass, a horizontal convolution of this pre-calculated vertical differences is performed, so that $$energy_k(m,n) = \sum_{j=-b_k}^{b_k} energyV_k(m, n+j)/(2b_k+1).$$

Instead of always subtracting the low-pass value from the kernel's central pixel (like, e.g., in the SAD approach), low-pass values placed in the centre of the corresponding column are subtracted (and likewise, the horizontal kernel size is effectively increased by a factor of two). This action decreases the energy value at the edges, providing for the increased contrast gain at the edges. At the same time, this operation is much cheaper in HW than the original CE formula, since it needs a number of $2a_k$ less line memories.

Advantageously, a maximum energy approach (ME) can be used to approximate the performance of the original SAD formula. Instead of performing horizontal convolution (sum) as in VSHC to find the total energy, the maximum value of the pre-calculated vertical energy factors is taken, given as $$energyM_k(m, n) = \max_{j=-b_k}^{b_k} (energyV_k(m, n + j)).$$

Effectively, a focus is placed on the peaks of the energy estimate, which actually reasonably follows the shape of the SAD function behavior. Advantageously, the calculation of this energy measure is much simpler. The observed effect is that this energy estimate is closer to the real SAD and LSD at "strong" edges, which is beneficial for avoiding ringing artifacts. However, it is to be noted that the LSD metric still yields better results in other parts of the image. A problem with the ME approach is that the focus on energy peaks gives gain reduction at image locations where artifacts would not occur, thereby resulting in a lower level of enhancement at places where this is not needed.

It is also possible to perform both vertical and horizontal maximum operations on the $|lpf_k(m, n)-in(m+i, n+j)|$ terms. To perform this operation in a separable way and to keep HW costs low, first the maximum in the vertical direction and then the maximum in the horizontal direction can be determined. This operation ensures that no ringing artifacts occur, but the level of enhancement in other image areas is rather limited.

Cross approximation (CA) is another approximate solution that is separable and that tries to perform similar to the SAD. The term "cross" refers to only using kernel elements on the horizontal and vertical axis crossing at the origin, leading to $$energyV_k(m, n) = \sum_{i=-a_k}^{a_k} |lpf_k(m, n) - in(m + i, n)|/(2a_k + 1),$$

$$energyH_k(m, n) = \sum_{j=-b_k}^{b_k} |lpf_k(m, n) - in(m, n + j)|/(2b_k + 1),$$

$$energyC_k(m, n) = (energyV_k(m, n) + energyH_k(m, n))/2.$$

In some cases, the performance of this approach is not satisfactory, particularly in the diagonal direction. Also, due to a small amount of averaging elements (out of $(2a_k+1)(2b_k+1)$ total support elements, only $2(a_k+b_k)+2$ elements are used), CA still exhibits a number of high-frequency elements which can be disturbing for display of details and may lead to a lower visual quality.

Approximation of SAD ($SAD^{ap}$), according to the invention, is an advantageous approach to realize otherwise 2D-non-separable SAD measurements in a separable way. Its results outperform all the other energy measurements, both on edges and on non-edge areas. It is constructed as an addition to VSHC measurement. The idea is to make a good approximation of SAD in a separable way, so that HW complexity remains very limited. The first step is to perform a VSHC measurement. The difference of VSHC to SAD is that instead of always subtracting a low-pass signal value from the centre of the kernel, a shifted version of the low pass signal is used which is positioned in the centre of the vertical column currently being processed. If this operation is written in a non-separable way and the summation is started column-wise, one has:

$$VSHC_k(m, n) = \sum_{j=-b_k}^{b_k} \sum_{i=-a_k}^{a_k} \left| \begin{array}{l} lpf_k(m, n + j) - \\ in(m + i, n + j) \end{array} \right| /[(2a_k + 1)(2b_k + 1)].$$

However, one actually would like to calculate $$SAD_k(m, n) = \sum_{i=-a_k}^{a_k} \sum_{j=-b_k}^{b_k} \left| \begin{array}{l} lpf_k(m, n) - \\ in(m + i, n + j) \end{array} \right| /[(2a_k + 1) * (2b_k + 1)].$$

Observing each member of the SAD and VSHC sums, one will notice the contribution to the SAD and VSHC calculation from a pixel member on the position (in+i, n+j) as sad(m+i, n+j) and vshc(m+i, n+j), respectively.

Figure 5:
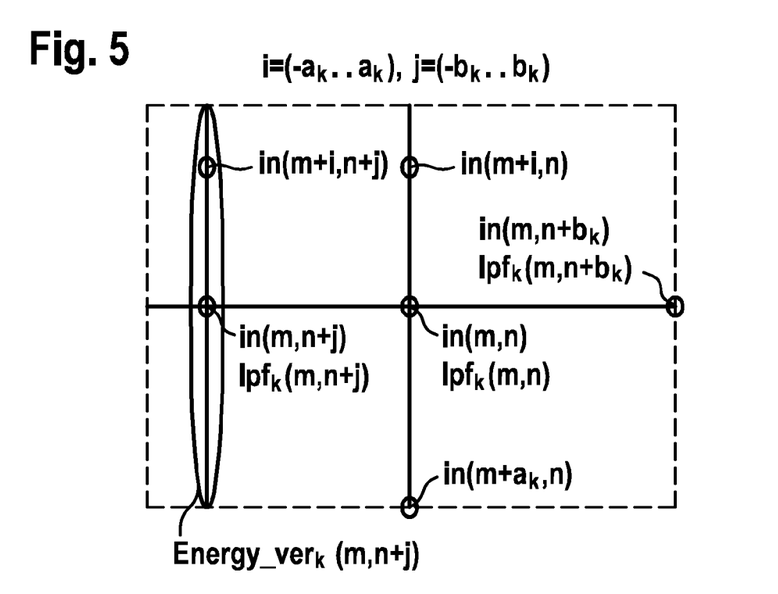
FIG. 5 schematically illustrates image and/or energy calculation within a support kernel according to a preferred embodiment of the invention.

Hence, $sad(m+i, n+j)=|lpf_k(m, n)-in(m+i, n+j)|$ and $vshc(m+i, n+j)=|lpf_k(m, n+j)-in(m+i, n+j)|$ hold. Further, using the inequality valid for all the real numbers: $|a+b| \le |a|+|b|$, one may write (see also FIG. 5):

$$sad(m + i, n + j) = |lpf_k(m, n) - in(m + i, n + j)|$$
$$= \left| \begin{array}{l} lpf_k(m, n) - lpf_k(m, n + j) + \\ lpf_k(m, n + j) - in(m + i, n + j) \end{array} \right|$$
$$\le |lpf_k(m, n) - lpf_k(m, n + j)| +$$
$$|lpf_k(m, n + j) - in(m + i, n + j)|$$
$$= |lpf_k(m, n) - lpf k_k(m, n + j)| +$$
$$vshc(m + i, n + j).$$

In other words, if extra elements $|lpf_k(m, n+j)-lpf_k(m, n)|$ are added around each pixel to the known VSHC calculation, SAD is over-estimated.

Hence, $sad(m+i, n+j) \le vshc(m+i, n+j)+|\Delta lpf(j)|$ holds. $\Delta lpf_k(j)=lpf_k(m, n)-lpf_k(m, n+j)$ represents the first order difference of the lpf signal on a distance j. The final result for the pixel on a position (m, n) is given as:

$$SAD_k(m, n) \le VSHC_k(m, n) + \sum_{j=-b_k}^{b_k} |lpf_k(m, n) - lpf_k(m, n + j)| =$$
$$VSHC_k(m, n) + \sum_{j=-b_k}^{b_k} |\Delta lpf_k(j)| \bigg|_{m,n} = SAD_k^{ap}.$$

The new energy measurement is referred to as $SAD_k^{ap}$, wherein the letters ap stand for approximation. The equality sign is valid when all elements $A=(lpf_k(m, n)-lpf_k(m, n+j))$ and $B=(lpf_k(m, n+j)-in(m+i, n+j))$ have the same sign. In the low-detail areas $|\Delta lpf(j)| \approx 0$ holds, which ensures the usage of the high detail gain and the same performance as the SAD energy measurement.

From FIG. 4, one can see that in case of a single horizontal edge, where in(m, n+j)=in(m+i, n+j), the inequality AB≥0 always holds. Likewise, using the combination of VSHC measurement and |Δlpf(j)|, the SAD on such an edge is exactly estimated, which benefits the performance. On other edge types, the SAD is over-estimated and LSD measurement is reached/outperformed.

The way to calculate $SAD^{ap}$ in a 2D separable way follows the similar steps as calculations of the VSHC. Firstly, a vertical energy calculation is performed:

$$energyV_k(m, n) = \frac{\sum_{i=-a_k}^{a_k} |lpf_k(m, n) - in(m + i, n)|}{(2a_k + 1)}.$$

In the second pass, a horizontal convolution of the pre-calculated vertical differences and an addition of the |Δlpf(j)| factors takes place:

$$SAD_k^{ap}(m, n) = \frac{\sum_{j=-b_k}^{b_k} energyV_k(m, n + j) + |lpf_k(m, n) - lpf_k(m, n + j)|}{(2b_k + 1)}.$$

To summarize the above, a way to calculate a modified energy measurement $SAD^{ap}$ by adding an energy term |Δlpf| to the basic calculation was presented. It is possible to use this energy term, but also any non-linear function g of that energy term g(|Δlpf|) that can reshape it to actual needs. Also similar terms and expressions that can reshape other local energy calculations are possible.

An additional advantageous benefit of this approach is a possibility to down-sample the |Δlpf(j)| energy signal since it is by default a low-pass signal. Herewith, an additionally reduction of HW costs is possible:

When a multi-scale sliding window in the spatial/frequency domain is built (see FIGS. 1A and 1B), the smallest kernel (window) is preferably a half-band filter, meaning that it passes frequencies till half of the Nyqvist ($f_N$) frequency. A next larger filter is a quarter-band filter (half of band of the filter on the previous scale), etc. Hence, the k-th window filter is the $(½)^k$-band filter. In ideal cases, that means that in the k-th window after filtering there is no frequency content left for frequencies higher than $(½)^k f_N$. Likewise, the $lpf_k$ and $|\Delta lpf_k|$ signals may be down-sampled by a factor of $2^k$, meaning that every sample in the $|\Delta lpf_k|$ sum but only every $2^k$-th sample is considered. Thus, only $2b_k/(2^k)$ samples are required. However, since low-pass filters that are used are newer ideal, some margin is preferred and the down-sampling factor should be lowered to $2^{k-1}$. For example, when k=4, and a horizontal number of samples in the kernel is 33, only 32/8=4 samples are required. In general, all kernel sizes are related to the size of the smallest kernel by the formula $b_k = 2^{k-1} b_1$, and the number of samples that is needed to represent the |Δlpf(j)| signal is $2b_k/(2^{k-1})=2b_1$, which is a constant not related to the current kernel size. Like this, the number of operations and HW elements is minimized.

In conclusion, the current invention provides a way to construct a 2D separable energy measurement (termed $SAD^{ap}$) outperforming SAD, and, in most cases, LSD. At the same time, HW overhead compared to VSHC, needed to achieve that performance, may be reduced according to the inventive solution. More generally spoken, a way to speed-up and simplify the SAD calculation is poroposed. This approach may be used in many other applications where calculation of the real SAD is too expensive. This is mainly the case when big SAD kernels are used.

To further improve the performance of a contrast enhancement algorithm, the original equations of the local contrast enhancement may advantageously be modified by making the contrast gain a non-linear function of the signal energy and some other signal metrics. Therefore, a basic gain formula $G_k = C_k/LD_k$ can be substituted with $G_k = f(LD_k, p_1, \ldots, p_n)$, where $p_1, \ldots, p_n$ is a set of parameters that represent additional signal features/preferences, like a local/global noise measurement, local contrast, signal gradient measurement, local energy measurements derived from other kernels, characteristics of the human visual system and contrast sensitivity functions, characteristics of the display medium (such as CRT, LCD, paper, etc.), user preferences (contrast gain, application-specific parameters), etc. The function $f$ is non-linear and can have any form that combines the previously mentioned parameters in a beneficial manner. For example, a way to improve the noise performance of the method is to limit the original contrast gain by introducing the Maximum gain limit and a linear response of a gain function to the LD, G~1/LD, as in FIG. 1C. The amplitude of the high-pass signals may also be used to discriminate noise from the relevant image features and prevent noise boosting, as disclosed in WO 2008 046 450 A1. To this end, further improvement of the general shape of the non-linear contrast gain function $G_k$ to $G_k = C_k/LD_k^n$, to gain a better control of the halo artifacts for medium-to-large edges is proposed in a further aspect of the invention.

To prevent halo artifacts, edge-preserving filters are often used. These edge-preserving filters include a second weight that depends on the intensity difference between the current pixel and its spatial neighbor, and therefore avoid strong filtering across the edges. A nearby pixel whose intensity is very different from the current pixel intensity is considered an outlier and its contribution to the local mean is reduced. Likewise, by preserving the sharpness at large transitions in the image (that correspond to HDR (High-Dynamic Range) edges), the low-pass filtered version of the image at such places is very similar to the original image, yielding negligible high-pass (in−$lpf_k$) and band-pass $B_k=(lpf_k-lpf_{k+1})$ image signals. Hence, the creation of ringing is minimized or completely reduced. However, the implementation costs of edge-preserving filters are much higher than the costs of Gaussian filters. In addition, they can also create double edges and false contours because they make concave/convex edges steeper then the original edges in the input. However, the original goal of using the edge-preserving filter for HDR image tone-mapping is attractive, but may preferably be used in a different form that does not introduce these artifacts and achieve a much lower computational complexity.

Figure 6A:
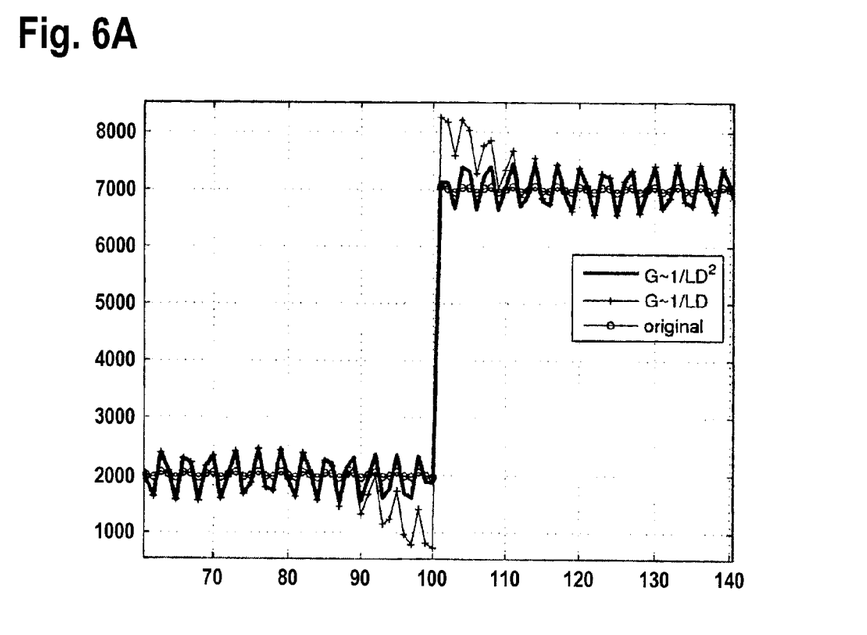
FIGS. 6A, 6B schematically illustrate a step function summed with a sine function and an input band-pass signal and a corresponding enhanced band-pass signal according to preferred embodiments of the invention.
Figure 6B:
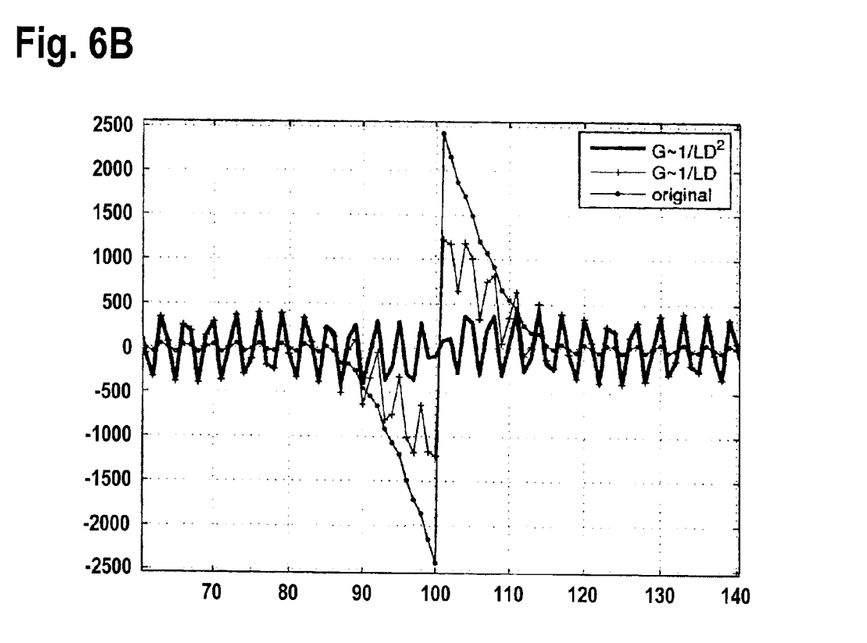

In essence, when a low-pass filtering across the HDR edge is performed, preferably a much smaller high(band)-pass output should be available than when filtering standard low- and medium-contrast edges. By doing so, large overshoots and undershoots (ringing) that are very typical artifact of many local-contrast rendering algorithms are completely removed (see also FIG. 6A). One can observe that the sum of the original band-pass signals already manifests large over/undershoot behavior (FIG. 6B, signal labeled as "original"). Any kind of linear gain control like unsharp masking would completely distort the image appearance on such an edge. The non-linear contrast gain often used in prior art, i.e. $G_k = C_k/LD_k$ compresses and limits this large over/undershoot, but still creates distortions (see FIG. 6A, G~1/LD). Therefore, an alternative gain function in the form of $G \sim 1/LD_k^n$ is proposed, which completely removes over and undershoots at large edges Enhanced band-pass output of our multi-scale scheme $$o = \text{in} + \sum_{k=1}^{K} \frac{C_k}{LD_k^n} \cdot (lpf_k - lpf_{k+1})$$

is much smaller for large edges than for the small, texture edges. This is visible in FIG. 6A ($G \sim 1/LD_k^2$), where enhanced output of the currently proposed gain function shows no halo artifacts. This was found by noticing that the scaled envelope of the shape of the $|B_k|$ signal very well corresponds to the shape of the local energy signal $LD_k$, like in $$LD_k \approx s \cdot |B_k|,$$

where scale s varies between 1 and 4 depending on the band, choice of the LD function and steepness of the edge. This implies that the enhancement signal of a band k for the original gain formula equals to $$C_k \cdot B_k / LD_k \approx C_k \cdot B_k / (s|B_k|) = \pm C_k/s = \text{const}.$$

Thus, the resulting enhanced band-pass signal for a certain band is approximately constant, regardless of the input image. The contrast gain limits (Maximum gain, linear gain $G \sim LD$, Minimum gain) as presented in FIG. 1C, will modify the contrast gain function, so that this amplitude equalization behavior is only approximately achieved. When this amplitude-equalized enhanced band-pass signal is added to the original image (a pyramid reconstruction starting from the original image and not from the largest low-pass filter $lpf_k$ is performed), relatively more is added to small- and medium-size edges than to large-size (HDR) edges. This is valid because the signal of the same amplitude is added to both small and large edges, and its relative contribution to large edges is much smaller that the contribution to smaller edges. This operation is beneficial in many cases, however, preferably not any signal should be added to upper-medium and large edges, because these edges are already well visible and any enhancement would probably not be appreciated. This is why we propose the modified contrast gain formula $G \sim 1/LD_k^n$ is proposed, which, for example, for n=2 yields the following enhancement signal of a band k:

$$C_k \cdot B_k / LD_k^2 \approx C_k \cdot B_k / (s|B_k|)^2 = \pm C_k/(sB_k) = \text{const}/B_k.$$

Likewise, the larger the input signal amplitude of a band, the smaller the enhanced output is. This effect may well be observed in FIG. 6B. As one can notice that for a large edge, the band-pass output is much smaller than for a small edge, which results in an almost unmodified total signal for the large edge, and a properly enhanced signal for the small edge, as in FIG. 6A. In essence, by using a special form of the gain contrast function, one can advantageously mimic the same effect as techniques employing edge-preserving filters, but with much lower cost and complexity. Evidently, the proposed contrast gain formula is just a feasible example of the explained principle; other non-linear formulas with similar properties may equally be used.

In summary of all the above, as a main measurement input, the local energy measurement LD was used to distinguish whether a certain region has a good or a poor visibility of local details, and likewise this visibility was improved when necessary. However, the local signal energy is by nature an average measurement and cannot in any cases distinguish whether the measured local energy results from a lot of small-to-medium energy contributions (texture region), or perhaps from a single, large contrast edge (isolated edge). Halo artifacts mainly originate from isolated edges and, therefore, preferably a metric is needed that is suitable to reliably distinguish the two previously mentioned cases. By using the above mentioned modified contrast gain, one can advantageously eliminate ringing at high-contrast edges, but still ringing may be created at medium-size edges when very high-contrast gains are used. At the same time and secondly, following the Weber-Fechner law, the perception of local contrast depends on the local average intensity level: the higher the local average intensity level, the higher the local contrast is needed to create an adequate visual perception. A good metric to consider both paradigms is the Local Contrast (LC), which can be defined as a relative difference between the maximum and minimum intensity values in a certain kernel $$LC_k(m,n) = \max(I(m+i,n+j)) - \min(I(m+i,n+j))/[\max(I(m+i,n+j)) + \min(I(m+i,n+j))],$$

where $i=-a_k, \ldots, +a_k$, $j=-b_k, \ldots, +b_k$. This LC can also be calculated in a 2D-separable fashion. The LD metric is a smooth function calculated by averaging a band-pass signal in a whole kernel, whereas the LC metric can change significantly from pixel to pixel, especially if the kernel just passes over a high-contrast edge. The presence of noise and outliers can also alter the real LC metric to some extent. To ensure that the LC is less sensitive to noise and outliers, two basic methods can be used.

Firstly, one can either calculate LC over a low-pass filtered signal $lpf_k$, like $$LC_k(m,n) = \max(lpf_k(m+i,n+j)) - \min(lpf_k(m+i,n+j))/[\max(lpf_k(m+i,n+j)) + \min(lpf_k(m+i,n+j))],$$

or, secondly, instead of taking the real minimum and maximum of the input signal, outliers may be skipped by demanding that a certain percentage of pixels exist above the upper limit and below the lower limit. The second option may be favorable due to its lower implementation cost.

As already stated, the LD metric is not sensitive to intensity. Therefore, the LC metric is needed to match the local contrast adequately with the properties of the human visual system. Likewise, one will modify the local contrast at each pixel (edge) in such a way that it really corresponds to the uniform visual perception of contrast. As such, a feature (edge) in a darker region needs less enhancement than the same size feature (edge) in a brighter region.

This is the reason why default formulation of the contrast gain $G \sim 1/LD_k^n$ is modified to include the LC measurement. As a first proposal, a gain factor to the previously calculated contrast gain $G_k$ may be applied that is inversely proportional to the amount of the local contrast LC. To reduce complexity, a piecewise linear simplification of this factor already gives a good performance. However, considering that a contrast gain function is already inversely proportional to the LD, a much easier solution is to define the new local contrast gain as $G_k = C_k/g(LD_k, LC_k)$, where $g(LD_k, LC_k) = LD_k^n$ if $LC < TH_k$ and $g(LD_k, LC_k) = LD_k^n + (LC_k - TH_k)$. Likewise, the effect of the LD metric is increased in cases when the LC metric is already large. Thresholds $TH_k$ can be kernel dependent (larger kernels introduce more visible ringing, so $TH_k$ is smaller for larger kernels) and it can be coupled to the concept of "just noticeable differences" (JND, for example, $TH_k = 10$ JND), meaning that when a local feature already has sufficient amount of contrast, further enhancement should be very limited.

Figure 7:
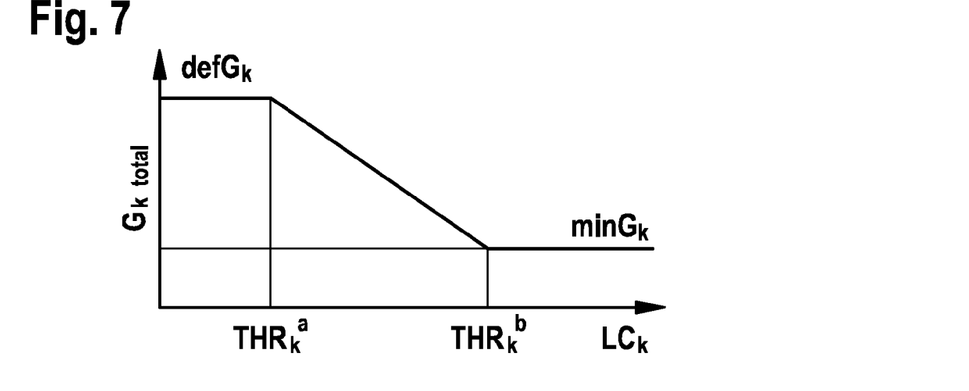
FIG. 7 schematically illustrates the use of the local contrast LC in detail gain calculation according to a preferred embodiment of the invention.

As a second proposal, for more precise control of the local contrast gain, it is beneficial to exactly define a value of local contrast gain. In the first proposal, this is not the case: the total gain will be reduced, but this gain can still be large enough to lead to undesired ringing, especially for medium-size edges. Therefore, a value of minimum gain level is defined that is allowed and does not introduce ringing artifacts as $minG_k$, so we interpolate between the default contrast gain $defG_k$ calculated in the previous steps and this minimum contrast gain (see FIG. 7), having a total contrast gain $G_{k\ total}$, specified by $$G_{k\ total} = \begin{cases} defG_k & \text{if } LC_k < TH_k^a \\ minG_k & \text{if } LC_k > TH_k^b \\ defG_k + (minG_k - defG_k) \\ (LC_k - TH_k^a)/(TH_k^b - TH_k^a) & \text{otherwise.} \end{cases}$$

Thresholds $TH_k^a$ and $TH_k^b$ are thresholds defined in a reference to JND. For example, $TH_k^a$ is 5 JND levels and $TH_k^b$ is a value of local contrast that already begins to give unacceptable level of ringing for a certain application, for example 10 JND levels.

Especially the second proposal provides significant advantages and more precise control of the local contrast gain. The explanation is related to techniques in photography for enhancing the picture quality. Usually, the LC is calculated separately for each kernel and then it represents a local contrast of that kernel. Likewise, when a certain kernel just passes over a high-contrast edge, a sudden jump of the LC measurement occurs and we minimize the enhancement contribution of that kernel. This contribution minimization will be reflected in lowering the contrast gain gradually from its nominal to its minimum level (sudden gain change would introduce perceptual artifacts). This concept is somewhat similar to the one taken in the design of the photographic tone-mapping operator which mimics the dodge-and-burn technique known from photography practice. There inventors try to find the largest surrounding area of a pixel that does not contain any large contrast edges. The low-pass value of this (largest) area will be used to stretch and therefore preserve the local contrast. The larger this area can be, the better the preservation of low-frequency local contrast. The low-pass value of the largest kernel can also be viewed as the local adaptation level of that area of the HDR image. Photographic tone mapping is similar to the proposed multi-band approach in that the enhanced band-pass signal created by kernels of increasing sizes is added to the input signal. The contrast gain function $G_{k\ total}$ should stop that process at the moment when a sufficiently large contrast edge is crossed (defined by $TH_k^b$). For example (see FIG. 1B), if a large-edge transition in the 4th kernel is detected, the contrast gain of the 4th kernel will be almost zero and there would only be added enhanced bands 1, 2' and 3' to the output. Effectively, this is similar to using a high-pass band 3 only (largest band not containing large edges), however, there still remains the flexibility to shape contributions of different frequencies of band 3 by means of the different contrast gains in its sub-bands 1, 2' and 3'. This is the reason why favorable enhancement results are thus achieved.

Starting from the enhancement equation $$o = in + \sum_{k=1}^{K} \frac{C_k}{LD_k} \cdot (lpf_k - lpf_{k+1}),$$

one can observe that the output image is created from the input image by adding amplified band-pass information. Adding a high-frequency signal can cause clipping of the total signal, especially in cases when the original input signal is close to its minimum or maximum value. The clipping leads to a very annoying waveform distortion, which should be prevented in any case. Since the gain function is controlled, it is best to avoid clipping at this position than instead at a later processing stage, after the addition of the enhancement signal.

Figure 8A:
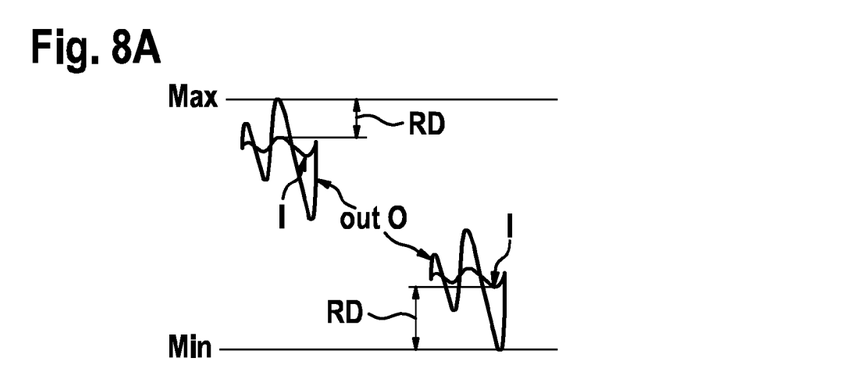
FIGS. 8A, 8B schematically illustrate a remaining distance determining maximum gain and global tone-mapping GTMF changes according to a preferred embodiment of the invention.

Two cases my be distinguished: clipping in black (at the minimum level Min) and clipping in white (at the maximum level Max). One has to ensure that the amplitude of the added enhancement band-pass signal G·B does not surpass the space left until the clipping level, which was marked as Remaining distance RD in FIG. 8A. The total output signal is bounded by Min<I+G·B<Max. For a positive sign of the band-pass signal B, at each position one may apply the gain limit formula: G<(I−Min)/|B| and for the negative sign of B, the formula is G<(Max−I)/|B|. To integrate this gain limitation better with the current gain formula and to increase its smoothness, the following gain limits are proposed: G<s·(I−Min)/LD for the clipping in black and G<s·(Max−I)/LD for the clipping in white. To simplify this limitation, it was noticed that the shape of the B signal very well corresponds to the shape of the scaled local energy signal LD (for s ∈[1 ... 4]), so they can be exchanged. The basic gain formula for band-pass undershoots (B<0) becomes now $G_k=\min(C_k \cdot LD_k, s \cdot (I-Min))/LD_k^2$ and for the band-pass overshoots (B>0) $G_k=\min(C_k \cdot LD_k, s \cdot (Max-I))/LD_k^2$.

Figure 8B:
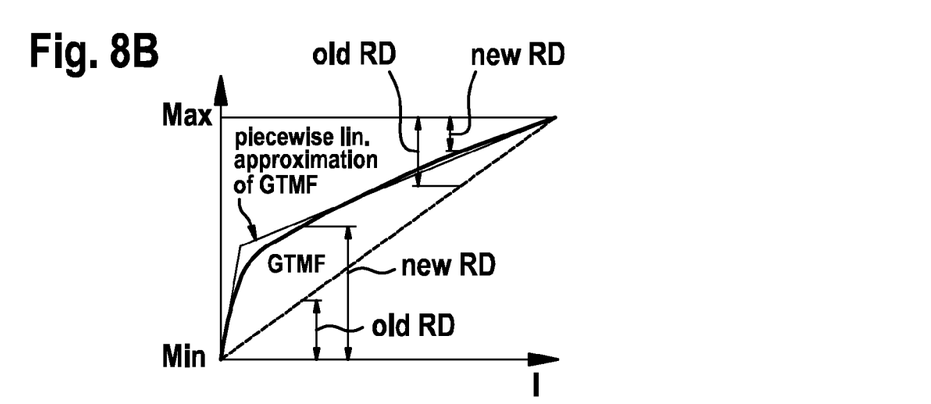

Previously it was demonstrated that it is beneficial to perform contrast enhancement in parallel with the Global Tone-Mapping Function (GTMF), and to add the enhanced high (band)-pass signal both before and after this function. Whatever this function is, if this enhancement signal is added after the GTMF, the Remaining Distance RD from the signal clipping borders is altered (see new/old RD, FIG. 8B). For example, with an employed GTMF function, it is decreased for higher values of the input signal I and high-pass overshoots and increased for the lower values of input I and high-pass undershoots. Therefore, the gain modifications have to fit with the characteristics of the GTMF function. This can be achieved in a relatively simple fashion: instead of taking the input signal I in the gain limit formula, one can take a transformed input signal GTMF(I). To perform this operation less costly, a piece-wise linear approximation of the GTMF can be performed. The gain formula for the band-pass undershoots (B<0) becomes now $G_k=\min(C_k \cdot LD_k, s \cdot (GTMF(I)-Min))/LD_k^2$ and for the band-pass overshoots (B>0) it is $G_k=\min(C_k \cdot LD_k, s \cdot (Max-GTMF(I)))/LD_k^2$.

The invention claimed is:

1. A method for obtaining and/or enhancing local contrast differences (LD) in digital image input data (in), wherein a local contrast measure ($SAD^{ap}$) approximating a two-dimensional sum of absolute difference (SAD) measure is obtained by obtaining a first-dimension sum of absolute difference measure (energy$V_k$(m, n)) representing a sum of absolute difference (SAD) in a first dimension of at least one image region, wherein (m, n) define positions, and obtaining the local contrast measure ($SAD^{ap}$) as a second-dimension convoluted first-dimension sum of absolute difference measure by convoluting the first-dimension sum of absolute difference measure (energy$V_k$(m, n)) in a second dimension of the at least one image region, wherein the step of obtaining the local contrast measure ($SAD^{ap}$) as the second-dimension convoluted first-dimension sum of absolute differences measure further includes an addition step wherein an energy term ($\Delta lpf_k$(j)) representing a first-order difference on a distance (j) of a low pass filtered signal used in obtaining the first-dimension sum of absolute differences measure (energyV$_k$(m, n)) and in obtaining the second-dimension convoluted first-dimension sum of absolute differences measure is introduced while obtaining the local contrast measure (SAD$^{ap}$).

2. A method according to claim 1, wherein the first dimension is a vertical dimension and wherein the second dimension is a horizontal dimension.

3. A method according to claim 1, wherein a kernel filter including at least one filter kernel having a vertical (2a$_k$+1) and a horizontal (2b$_k$+1) size is used, and wherein the low pass filtered signal (lpf$_k$) represents the local mean of at least one filter kernel.

4. A method according to claim 1, wherein a multi-scale approach is used, the multi-scale approach including local processing with k filters of different scales.

5. A method according to claim 3, wherein the first-dimension sum of absolute difference measure, (energyV$_k$(m, n)), for each pixel of an input image data (in) at a position (m, n), using a low pass filtered signal (lpf$_k$) representing a local mean of a filter kernel (k) is obtained according to $$energyV_k(m, n) = \frac{\sum_{i=-a_k}^{a_k} |lpf_k(m, n) - in(m + i, n)|}{(2a_k + 1)},$$

wherein (2a$_k$+1) represents a vertical kernel size in a k-th kernel.

6. A method according to claim 5, wherein the second-dimension convoluted first-dimension sum of absolute difference measure is obtained according to $$SAD_k^{ap}(m, n) = \frac{\sum_{j=-b_k}^{b_k} energyV_k(m, n + j) + |lpf_k(m, n) - lpf_k(m, n + j)|}{(2b_k + 1)},$$

wherein (2b$_k$+1) represents a horizontal kernel size in a k-th kernel.

7. A method according to claim 1, wherein the energy term (Δlpf$_k$)(j)) representing the first-order difference on a distance (j) of the low pass filtered signal (lpf$_k$) is obtained according to $$\Delta lpf_k(j) = \frac{\sum_{j=-b_k}^{b_k} |lpf_k(m, n) - lpf_k(m, n + j)|}{(2b_k + 1)}.$$

8. A method according to claim 1, wherein the low pass filtered signal (lpf$_k$) and/or the energy term (Δlpf$_k$)(j)) is down-sampled by a factor of at most $2^k$.

9. A method according to claim 1, further including enhancing local contrast differences (LD) by using a gain value (G) proportional to an inverse power of the local contrast difference (LD) in a k-th kernel.

10. A method according to claim 1, further including reducing halo artifacts based on a local contrast (LC) measure defined as a relative difference between the maximum and minimum intensity values in a certain kernel.

11. A method according to claim 1, further including a step of preventing signal clipping by adjusting a gain function (G) based on a shape (s) of a signal of the local contrast difference (LD), and an intensity (I) in relation to a maximum (Max) and a minimum (Min) value according to:

$$G < s \cdot (I - \text{Min})/LD$$

and/or to:

$$G < s \cdot (\text{Max} - I)/LD.$$

12. A system for obtaining and/or enhancing local contrast differences (LD) in digital image input data (in) configured to obtain a local contrast measure (SAD$^{ap}$) approximating a two-dimensional sum of absolute difference (SAD) measure according to claim 1 by
  a computer system configured to obtain a first-dimension sum of absolute difference measure (energyV$_k$(m, n)) relating to a sum of absolute difference (SAD) in a first dimension of at least one image region, and
  the computer system configured to obtain the local contrast measure (SAD$^{ap}$) as a second-dimension convoluted first-dimension sum of absolute difference measure by convoluting the first-dimension sum of absolute difference measure (energyV$_k$(m, n)) in a second dimension of the at least one image region,
  wherein
  the computer system configured to obtain the local contrast measure (SAD$^{ap}$) as the second-dimension convoluted first-dimension sum of absolute differences measure by adding an energy term (Δlpf$_k$)(j)) representing a first-order difference on a distance (j) of a low pass filtered signal used in obtaining the first-dimension sum of absolute differences measure (energyV$_k$(m, n)) and in obtaining the second-dimension convoluted first-dimension sum of absolute differences measure while obtaining the local contrast measure (SAD$^{ap}$) measure.

13. A non-transitory computer-readable medium containing instructions, wherein the instructions are executed on a computer system to perform the method steps of claim 1.

* * * * *